US009519477B2

(12) United States Patent
Champlin-Scharff et al.

(10) Patent No.: US 9,519,477 B2
(45) Date of Patent: Dec. 13, 2016

(54) AUTOMATIC PRE-DETECTION OF POTENTIAL CODING ISSUES AND RECOMMENDATION FOR RESOLUTION ACTIONS

(71) Applicant: International Business Machines Corporation, Armonk, NY (US)

(72) Inventors: George Howard Champlin-Scharff, Littleton, MA (US); Timothy Bruce Snow, Littleton, MA (US); Sabrina Yee, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 14/028,048

(22) Filed: Sep. 16, 2013

(65) Prior Publication Data

US 2015/0082277 A1    Mar. 19, 2015

(51) Int. Cl.
*G06F 9/44* (2006.01)
*G06F 11/36* (2006.01)
*G06F 15/18* (2006.01)
*G06F 11/00* (2006.01)

(52) U.S. Cl.
CPC . *G06F 8/70* (2013.01); *G06F 8/30* (2013.01); *G06F 9/4443* (2013.01); *G06F 9/4448* (2013.01); *G06F 11/008* (2013.01); *G06F 11/3684* (2013.01); *G06F 15/18* (2013.01)

(58) Field of Classification Search
CPC .... G06F 11/3664; G06F 11/3688; G06F 8/30; G06F 8/70; G06F 9/4443; G06F 9/4448; G06F 9/465; G06F 17/30864
See application file for complete search history.

(56) References Cited

U.S. PATENT DOCUMENTS

| | | |
|---|---|---|
| 6,275,976 B1 | 8/2001 | Scandura |
| 7,861,226 B1 * | 12/2010 | Episkopos et al. ........... 717/124 |
| 8,468,503 B2 * | 6/2013 | Grosse et al. ................ 717/131 |
| 8,881,095 B1 * | 11/2014 | Hunt, Jr. et al. ............. 717/102 |
| 8,924,935 B1 * | 12/2014 | Chopra et al. ................ 717/124 |
| 2003/0046661 A1 | 3/2003 | Farber et al. |

(Continued)

OTHER PUBLICATIONS

Asthana et al., Integrative Software Design for Reliability Beyond Models and Defect Prediction, 2012, pp. 37-60.*

(Continued)

*Primary Examiner* — Lewis A Bullock, Jr.
*Assistant Examiner* — Tina Huynh
(74) *Attorney, Agent, or Firm* — Robert H. Frantz; Reza Sarbakhsh

(57) ABSTRACT

A tool for automatic pre-detection of potential software product impact according to a statement placed in a software development system, and for automatically recommending for resolutions which accesses a repository of information containing a history of changes and effects of the changes for a software project; using a received a statement in natural language to perform a natural language search of the repository; according to the findings of the search of the repository, using a machine learning model to compose an impact prediction regarding the received statement relative to the findings; and automatically placing an advisory notice regarding to the impact prediction into the software development system, wherein the advisory notice is associated with the received statement.

20 Claims, 7 Drawing Sheets

(56) References Cited

U.S. PATENT DOCUMENTS

| | | | |
|---|---|---|---|
| 2008/0256393 A1* | 10/2008 | Ur | 714/38 |
| 2010/0058287 A1* | 3/2010 | Sundararajan | G06F 8/71 717/104 |
| 2010/0180259 A1* | 7/2010 | Lindley | 717/124 |
| 2011/0061040 A1* | 3/2011 | Shaheen et al. | 717/100 |
| 2011/0066557 A1* | 3/2011 | Bassin et al. | 705/301 |
| 2011/0246462 A1* | 10/2011 | Wu et al. | 707/736 |
| 2011/0321007 A1* | 12/2011 | Marum et al. | 717/113 |
| 2012/0311389 A1* | 12/2012 | Pasala et al. | 714/47.3 |
| 2013/0074033 A1 | 3/2013 | Hall et al. | |
| 2014/0137071 A1* | 5/2014 | Wadhwani | G06F 11/3604 717/101 |
| 2014/0165043 A1* | 6/2014 | Pasala et al. | 717/124 |
| 2014/0325480 A1* | 10/2014 | Bhagavatula | 717/124 |
| 2014/0337814 A1* | 11/2014 | Kalns et al. | 717/100 |

OTHER PUBLICATIONS

Suffian et al., A Prediction Model for System Testing Defects using Regression Analysis, Jul. 25, 2012, pp. 55-68.*
Yadav et al., Early Software Defects Prediction Using Fuzzy Logic, Jul. 2012, pp. 399-408.*
IBM; "IM Rational Team Concert"; Mar. 2013.
Phillips, Winfred; "Introduction to Logic for Protothinker", retrieved on Sep. 5, 2013 from http://www.mind.ilstu.edu/curriculum/protothinker/.
Jazz Community Site; "About Jazz: Platform", copyright 2005-2008, retrieved on Sep. 6, 2013 from https://jazz.net/story/about/about-jazz-platform.jsp.
Ismael, Chris; "List of 25+ Natural Language Processing APIs", Apr. 26, 2013, retrieved on Jun. 7, 2015 from http://blog.mashape.com/list-of-25-natural-language-processing-apis/.

* cited by examiner

AUTOMATIC PRE-DETECTION OF POTENTIAL CODING ISSUES AND RECOMMENDATION FOR RESOLUTION ACTIONS

CROSS-REFERENCE TO RELATED APPLICATIONS (CLAIMING BENEFIT UNDER 35 U.S.C. 120)

None.

FEDERALLY SPONSORED RESEARCH AND DEVELOPMENT STATEMENT

None.

MICROFICHE APPENDIX

Not applicable.

INCORPORATION BY REFERENCE

None.

FIELD OF THE INVENTION

The present invention relates to software development tools and software quality improvement processes.

BACKGROUND OF INVENTION

Many software products are developed, maintained, and improved through a project management process, which is generally well-understood and supported by formal software engineering education programs. Many separate, and some integrated, tools have been developed, which are used by software developers to automate, track, and control the configuration of released and delivered software products.

Referring now to FIG. 1 *b*, a generalized process flow of software development is shown, in which software requirements (103) for new products and new features to existing software products are received into a formal software development process (110). The source code and compiler directive files are then received (111) or "checked in" to a configuration management system, subsequent to which one or more test cases are executed (112) against the code to verify one or more of the requirements are met and to identify any errors in the code.

Modules, methods, libraries, etc., which pass the test are then promoted to a released status (113), so that they may be deployed, installed, sold, distributed, etc. (114), for end use.

During the life cycle of the software product, one or more bug reports or feature requests may be received (104), which in turn are reflected in new or revised requirements (103), and the cycle (110-114) is repeated.

This is a very generalized view of the software development process, of course, but it serves the purpose for the present disclosure.

SUMMARY OF THE INVENTION

Embodiments according to the present invention provide a tool for automatic pre-detection of potential software product impact according to a statement placed in a software development system, and for automatically recommending for resolutions which accesses a repository of information containing a history of changes and effects of the changes for a software project; using a received a statement in natural language to perform a natural language search of the repository; according to the findings of the search of the repository, using a machine learning model to compose an impact prediction regarding the received statement relative to the findings; and automatically placing an advisory notice regarding to the impact prediction into the software development system, wherein the advisory notice is associated with the received statement.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF EMBODIMENT(S) OF THE INVENTION

Figure 1A:
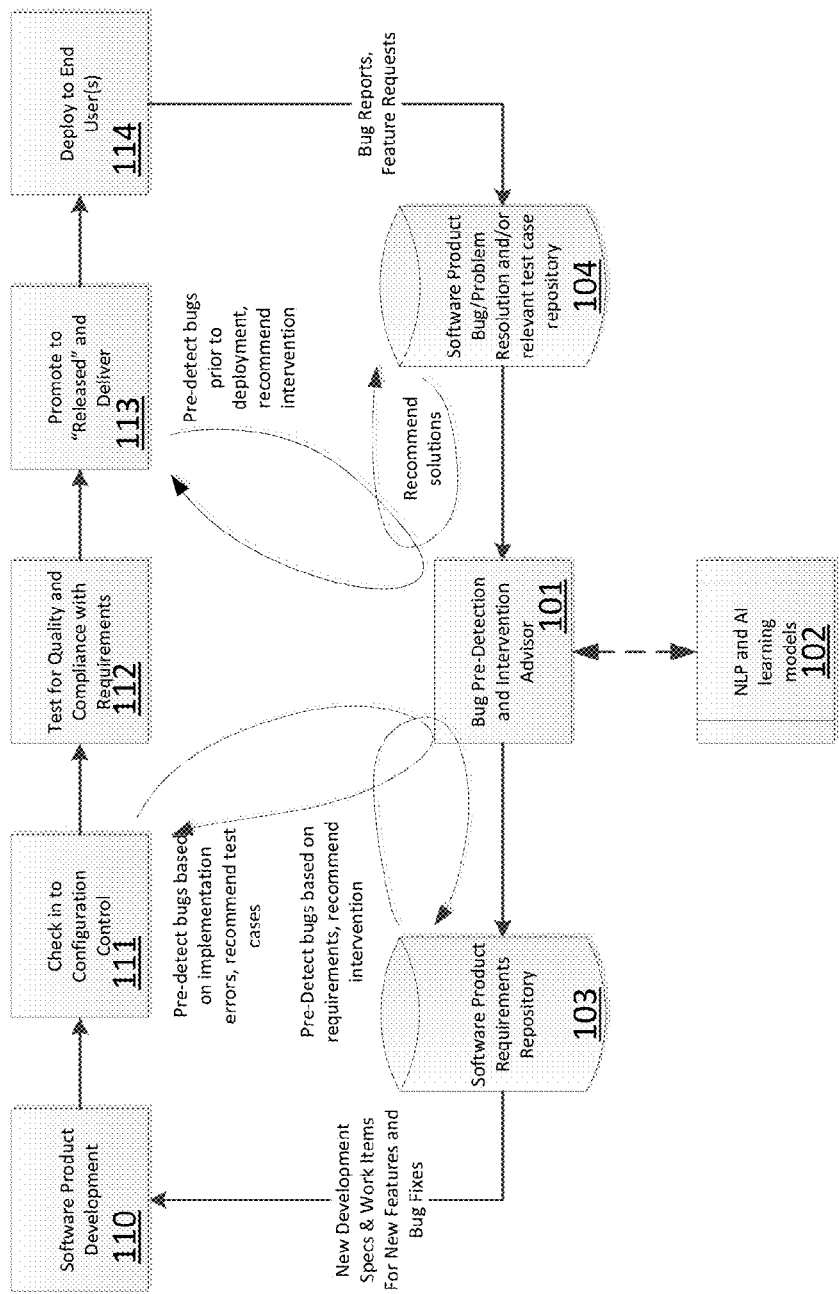
FIG. 1*a* illustrates an overall embodiment according to the present invention, including a plurality of optional features and advantages.

The present inventors have recognized a problem in the art, which is currently unrecognized and unsolved. During software development of complex software products, many different people involved in the development, test, configuration, and deployment processes encounter of the same issues at different times. For example, one developer might change a setting or method, causing problems with the code. Then, a month later, another developer might do exactly the same thing.

Such events are usually discussed in "bug" tracking tools, software development planning tools, developer code comments, and other solutions. However, the present inventors have realized that the current search tools are inadequate to find problem reports, which discuss the same root problem but may use different terminology, situations and examples to do so.

The inventors have recognized that the limitations of such exercises searching for problem and bug discussions arise from the fact that the search engines conduct their searching and scoring too literally, looking for exact or similar terminology. So, the present inventors have set out, in a first advantage of the present invention, to develop an improved software problem discussion search methodology and a tool that "pre-detects" potential coding issues using Natural Language Processing (NLP).

Additionally, the present inventors have recognized that test case generation is typically manually performed, and it is a time consuming phase of the development process. Further, the quality of test cases varies depending on the authors' skill sets and how well the author knows the product being tested and its potential problem areas. A highly-skilled, highly-experienced test case author comes to know the patterns or mistakes of a software team and the areas of vulnerabilities of a particular software product, and can use intuition to guide his or her test cases to exercise those areas of the product as it is evolved and updated. Existing test cases are typically carried over across multiple releases and revisions of the software product, and such legacy test cases can become outdated due to feature changes and enhancements. Moreover, it is often being overlooked in everyday work to leverage defects discovered previously, sometimes by another person, and apply the related test cases to other parts of the product. This can be particularly true in a large organization, especially in organizations that work across disparate time zones, geographies, and development methodologies.

In a second advantage of the present invention, the inventors provide a means and mechanism to intelligently re-use test cases, abandoning those that are completely outdated or obsoleted, re-using those that are still applicable, and recommending modifications to those that are still partially applicable but partially inapplicable.

Generalities of Natural Language Searching

Embodiments of the present invention preferably employ natural language searching. For clarity, we present some background information of natural language searching, and compare it to the more commonplace keyword searching.

First, we should clarify what we mean by "natural language", as some in the art have pointed out that even this term is up for debate, such as Winfred Philips in "Introduction to Logic for *ProtoThinker*" (2006). For the purposes of this disclosure, we are referring to user input into a user interface on a computer which allows for natural queries rather than structured queries. For example, a structured query to search for all patents that relate to stack overflow errors might look something like [stack NEAR (overflow OR "over flow")]. This would search for instances of keyword "stack" within a pre-set number of words (e.g., "near" operator) of the keyword "overflow" or near the keyword combination "over flow".

A natural language input, however, for the same query would not require such computer-based syntax, rather it would allow for an input such as "find me patents about stack overflow errors". A natural language processor (NLP) would parse this input, apply a plethora of rules, grammars, lexicons, synonym lists, etc., to extract a first constituent term "find", which could be mapped to a computer command "search". The NLP would also use its resources to determine that the constituent term "stack overflow" may also be expressed in the searched corpus as constituent terms "stack over flow", "over flow the stack", "overflow a stack", etc., using synonym lists, grammars, etc.

Also, it should be noted that the searched corpus may or may not be in natural language. In the context of the present invention, the corpus may include software source code as well as release notes. The latter, release notes, may be in document form, such as a word processor electronic files, and thus could be expected to contain natural language statements. The former, software source code, may have structured statements, e.g., software statements such as C, C++ or Java statements, as well as natural language statements such as programmer comments and text which may be printed to a user output device.

For the purposes of the present disclosure, we presume that both the user input and the searched corpus contain natural language statements. And, for the purposes of the present disclosure, it is presumed that the reader is familiar with natural language processing and available NLP products, such that the present disclosure provides additional information which uses or calls NLP resources as a platform, but does not necessarily include NLP within the invention embodiments. Any suitable NLP processor may be employed to search a corpus in the inventive manner disclosed in the following paragraphs.

Therefore, our phrase NLP searching shall mean to receive an input phrase from a user that is expressed in natural language, to apply NLP to that input phrase to extract symbols from it, and then to search on those symbols in a corpus, wherein the corpus also contains natural language and/or structured language.

NLP searching is usually much broader than keyword searching for several reasons. First, it allows the user to express his or her needs in a manner more suitable for the user, and less constrained by system requirements. This increases the likelihood that the search query itself is accurately directed towards the desired information. Second, by extracting the symbols from the natural language input, the search and proceed not only on the symbols, but also on their aliases and synonyms. In the foregoing example, the term "stack" may be searched (a symbol found in the original user's input query), and the synonym "heap" may also be searched according to a synonym list. And, the term "overflow" may be searched as well as an antonym "underflow". For a user to achieve the same search breadth, he or she would have to have expertise to craft a much more complicated structured query and would have to be diligent enough to look up many synonyms and antonyms, as well as to formulate similarly-meaningful alternative phrases.

Therefore, for the purposes of this disclosure, natural language searching shall mean receiving a natural language expression as an search query input, applying one or more NLP techniques including deductive logic, inductive logic, validity and soundness checks, rules of though (e.g., principle of contradiction, law of excluded middle, etc.), truth functionalities (e.g. Modus Ponens, Modus Tollens, hypothetical syllogism, denying an antecedent, affirming a consequent, etc.), predicate logic, sorites arguments, ethymemes, syntactic analysis, semantic analysis, and pragmatics. Syntactic analysis may contain one or more parsers, such as noise-disposal parsers, state-machine parsers, and definite clause parsers, and it may include pre-determined and updateable grammars (e.g. recognizable grammar structures), such as context-free notations (e.g. Backus-Naur forms, etc.). A semantic analyzer may, based on the results of the syntactic analysis or interactively operating with syntactic analysis, determines the meaning of a phrase, statement or sentence. Most semantic analyzers attempt to re-write the phrase, statement or sentence into a context-free form so that it can be more readily found in a lexicon and mapped to an intended or implicit meaning. Pragmatics then operates to further reduce remaining ambiguities by applying reasonable domain scope, resolving anaphoras, and using inferencing to generate alternative expressions for the same meaning (upon which the search can be performed, as well).

These and other techniques are known in the art among academics, computer scientists, linguistic researchers, and product developers such that one may use NLP for other applications by obtaining an appropriate NLP product and integrating its functions via an Application Programming Interface (API), for example. As such, we will not provide further details into NLP, as it is suffice to say that embodiments of the present invention employ one or more such available products. IBM's Watson currently has a proprietary interface for application programs, and a number of open API's are available for applications developers to other NLP platforms and products, such as Stremor Automated Summary and Abstract Generator™, Repustate Sentiment and Social Media Analytics™, Skyttle, SpringSense Meaning Recognition™, etc.

Natural language searching can be further enhanced by the addition of language models which employ Artificial Intelligence (AI) techniques so that their performance converges on a desired outcome throughout usage. For example, if in a first search, a user or administrator marks certain found items as "better" and certain other found items as "worse", and AI engine can then adjust certain parametric weights to the NLP methods and processes to favor the rules and methods which generated the "better" outputs and to disfavor the rules and methods which generated the "worse" outputs. In a second search, the use may again mark some results as better and others as worse, and the AI engine can further tune the parametric weights, and so forth. Over time and usage, the NLP searching will become more and more accurate at finding and outputting the kind of results the user or administrator desires by "learning" the user's or administrator's preferences.

System-Level Description of Embodiments

Figure 1B:
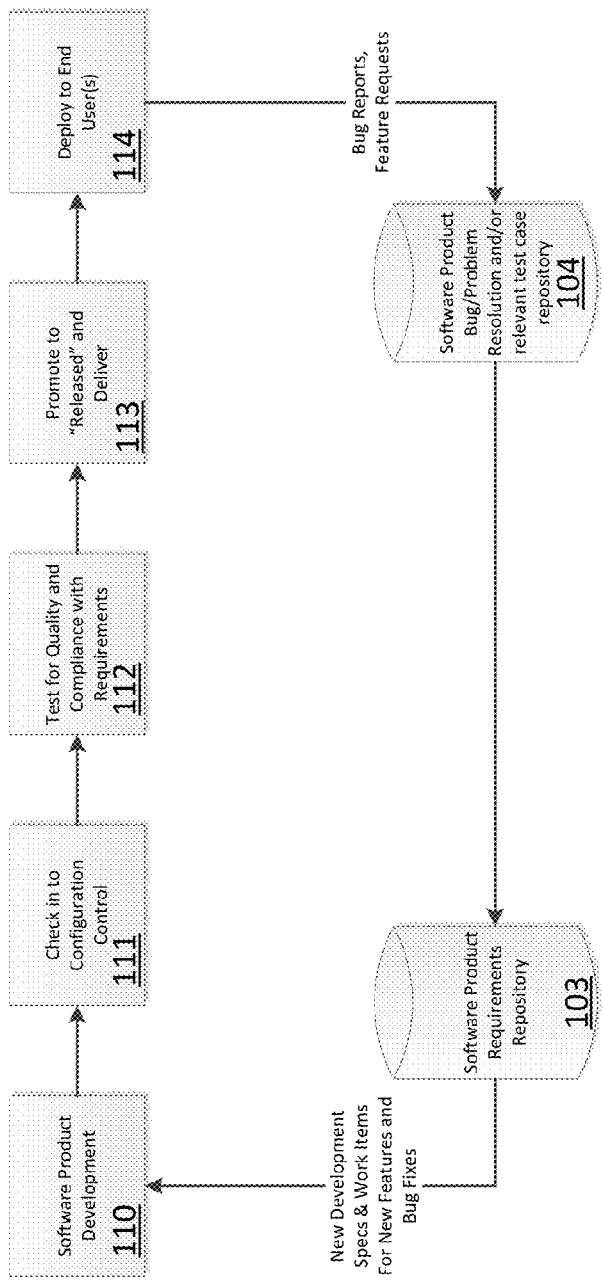
FIG. 1*b* represents a general process of software development and maintenance.

Turning to FIG. 1a, the process of FIG. 1b is annotated to show the different points, at which embodiments of the present invention may be advantageous during traditional software development and project management. Embodiments may implement any one or more of the features in allowing pre-detection and advisory intervention notices responsive to changes in requirements, changes in check-in code, changes in released code, and changes in bug reports or feature requests, as will be discussed in greater detail in the following paragraphs. One or more Artificial Intelligence (AI) learning models (102) and a bug pre-detection tool (101) are communicably interfaced to or integrated into well-known software development tools, as will be discussed in greater detail in the following paragraphs, too.

To provide the foregoing advantages, embodiments according to the present invention will follow these three general phases of operation:
1. Prior to processing any search for similar software problem descriptions, a repository of textual descriptions of a history of changes to the software product would be created by gathering information (or a collection of links to information) from different sources such as from bug tracking databases, extracted comments in source code, and "one liner" comments captured in software version control systems.
2. After the repository has been created, a user would input a description of the changes he or she is going to make to the software source code into the comments of an enhanced bug tracking tool, then he or she would click a button, which would scan the repository while searching for similar changes made in the past, using NLP methods to search for matches rather than just prevalence of keywords and synonyms.
3. The results of the NLP-based search would be displayed to the user, showing similar changes made in the past and indicating whether the previous changes were found to be problematic (e.g., had to be backed out, had to be blocked from inclusion in a release, had to be patched, etc).

For example, a user could input into the enhanced bug tracking system's user interface that they are planning to add a hashmap to a software design or product. Such user input might include a natural language description of what functions would use the hashmap, and what data structures the hashmap would relate to each other, and to which particular method or code module the hashmap would be added, such as com.my.package.

The resulting NLP-based search might find instances in the past, in which hashmaps were used in similar circumstances and caused performance issues. Once a repository of defects, comments, and past actions has be created, the system can use Machine Learning to generate models to make suggestions smarter and more accurate.

In addition to being able to pre-detect coding problems, embodiments of the invention will make test case generation and test automation smarter. Existing work artifacts and test cases will be leveraged to form the core knowledge base (e.g., the repository). Based on this knowledge base, embodiments of the invention will automatically generate new test suites (collections of test cases) to run on a selective automation segment that will likely catch a problem, and will suggest which test suites or test cases within test suites will unlikely produce useful results. This will not only save time on running test automation, but will also enhance the efficiency of identifying relevant problems.

Exemplary Embodiment

At least one embodiment according to the present invention provides an improvement and extension to currently-available tools commonly used in Software Development efforts, Requirements Tooling, Project Planning, Version Control Systems, and Software Test Tools. For the scope of this example embodiment, these tools can be traditionally separate tools, which are well known individually in the art, or they may be tools within a Software Lifecycle Management solution, such as IBM's Rational Team Concert™.

Initializing the Repository.

Before the bug pre-detection method and tool of the present invention is used by a user, training data will be ingested by the system originating from a variety of sources. This would likely include, but not limited to, defect tracking databases, requirements documents, work items, and test cases generated during prior releases, as well as comments from known defect-free sections of code.

Figure 2:
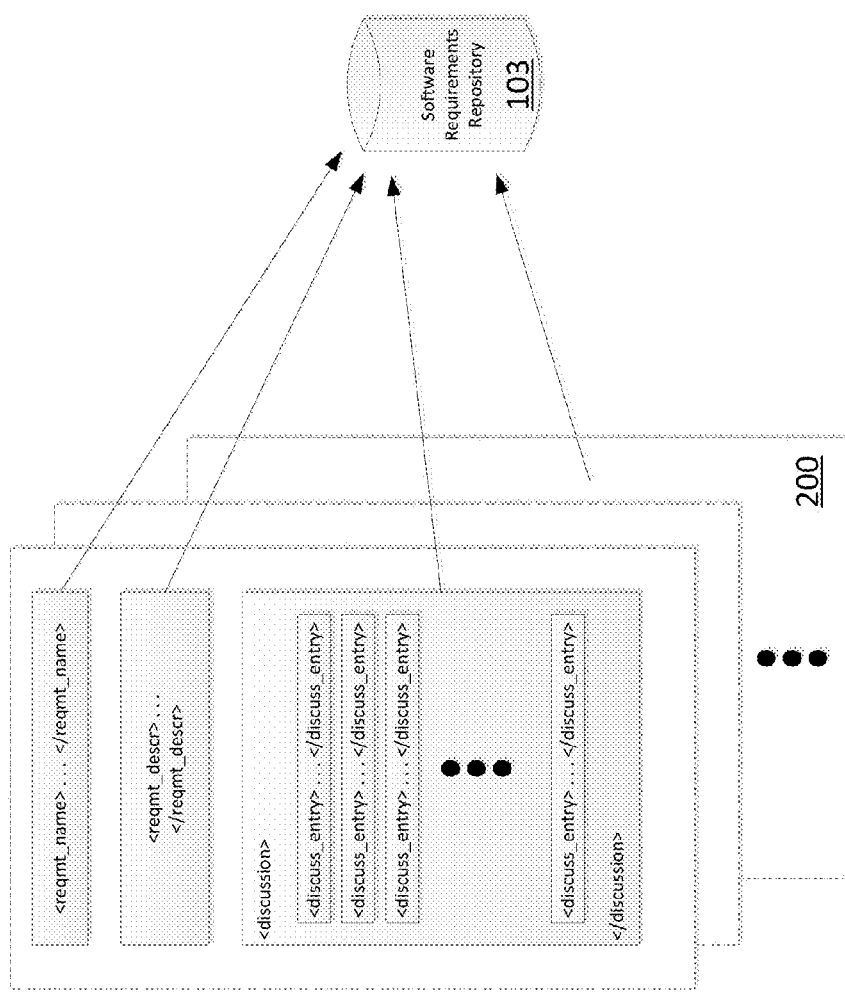
FIG. 2 depicts the gathering of natural language text from a variety of sources, in this particular scenario, from requirements documents.

As the development of a new software release begins, requirements must be collected. FIG. 2 shows some typical components of natural language text, which can be gathered from a requirements document or database (200), including a requirement name, a requirement description, and one or more discussion entries relating to that requirement. Such information may be digitally represented by plain text documents, word processor documents, database records, eXtensible Markup Language (XML), as well as in other digital format. For example, a requirement for the compatibility of a software method with an particular standard might be represented in XML as follows:

```
<method_requirement>
    <method_name> name-of-method </method_name>
    <reqmt_name> textual-name-of-requirement </reqmt_name>
    <reqmt_descr> " This is a description in natural language of this
        requirement . . . " </reqmt_descr>
    <discussion_thread>
        <discussion_entry>
            <disc_date> 01-01-2013 </disc_date>
            <disc_author> R Smith </disc_author>
            <disc_body> "I think this requirement may cause
                some incompatibilities with XYZ module
                because . . . " </disc_body>
        </discuss_entry>
        <discussion_entry>
            <disc_date> 01-02-2013 </disc_date>
            <disc_author> S Yee </disc_author>
            <disc_body> "Compatibility should be OK because
                XYZ module has an option to . . . "
                </disc_body>
        </discuss_entry>
        <discussion_entry>
            <disc_date> 01-05-2013 </disc_date>
            <disc_author> R Patel </disc_author>
            <disc_body> "I just checked and that option was not
                implemented because . . . "
    </disc_body>
        </discuss_entry>
        . . .
    </discussion_thread>
</method_requirement>
```

In this example, one can see that a new requirement is discussed in natural language and its compatibility or incompatibility with another modules or methods in the software product. An NLP search engine will be able to find these entries after they are indexed or ingested into the repository.

So, for the purposes of this illustrative example, we will focus on the requirements content describing the requirement and the subsequent discussion used to decide whether or not to approve or reject the requirement. Once the requirement document has been saved into the repository (103) (or linked to the repository), the embodiment of the invention will send the content of that document to the NLP-based bug pre-detection tool to enable impact prediction of future propose requirements and changes.

Response to New Requirement or Change to a Requirement.

Figure 3:
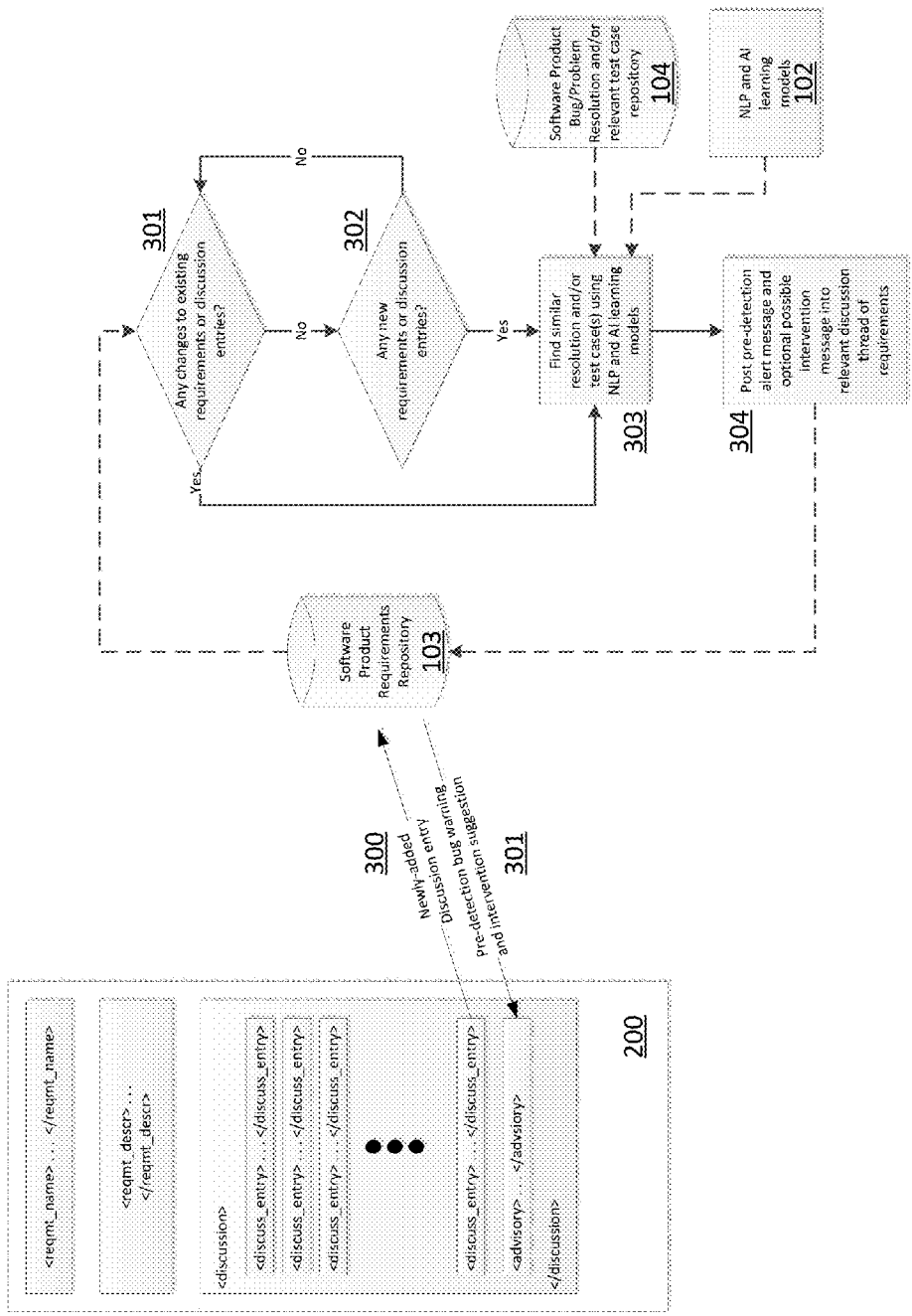
FIG. 3 shows a logical process for processing a new requirement or a change to a requirement, to pre-detect possible software errors that might be induced into the software product, and to automatically provide an advisory regarding potential interventional steps or approaches.

The output of the NLP-based bug pre-detection tool will be compared with models (102) generated by Machine Learning, as shown in FIG. 3. Please note that in this embodiment, it is assumed that training data (102) has been previously generated. As continued discussion happens around the requirement, or when the requirement itself is updated (300, 103, 301, 302), the new pre-detection tool will continuously send the new or revised content back through the tool and compare it against the trained models. As content is added or removed from the requirement content, or discussion content added, an "intervention" step will be proposed (304), if available, based on previous test case results and/or problem resolutions according to the results of the Natural Language Processing (NLP) search (303). Based on previous knowledge in the form of our trained models (102) and, if available, previous bug resolution notes (104), the bug pre-detection tool will offer suggestions in the form of automatically-generated discussion comments (301) or other suitable notices (e-mails, text messages, etc.) as to whether or not the proposals in the latest revision of the document will improve software quality in terms of the likelihood of introducing new defects, or triggering previously solved defects, which is illustrated in FIG. 3.

An added advisory entry to a discussion thread might appear as follows:

```
<discussion_entry>
    <disc_date> 01-07-2013 </disc_date>
    <disc_author> Bug Pre-detector </disc_author>
    <disc_body> "ADVISORY: The bug pre-detector
        tool has found similar changes that resulted
        in one or more bug(s). Description(s) of the
        bug(s) and the corrective action(s) can be
        found at the following hyperlinks . . . "
        <link> link_1 </link>
        <link> link_2 </link>
        . . .
        <link> link_3 </link>
    </disc_body>
</discuss_entry>
```

Updating of AI Network.

Figure 4:
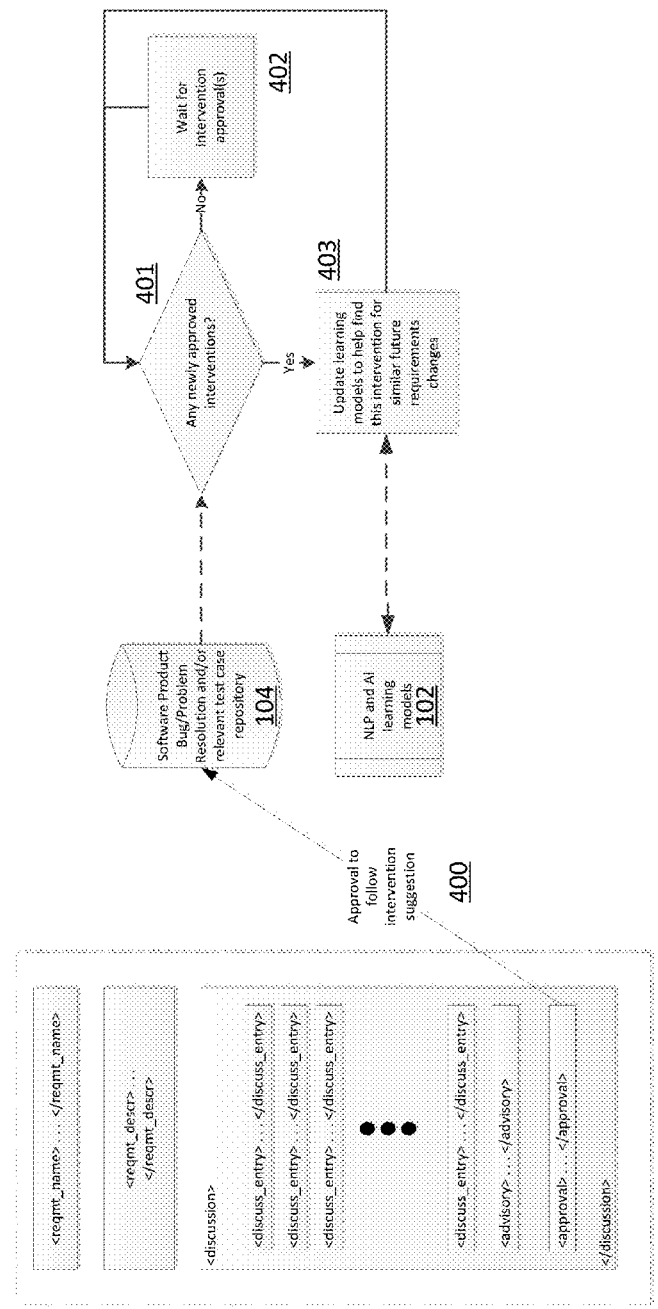
FIG. 4 reflects a similar process for pre-detecting and advising for new bug reports.

Once the requirement or change to the requirement has been approved, the final content of the requirement will be sent through the pre-detection tool (104, 401, 402) and, once annotated (403), will be used to update the training data (102) for the Machine Learning Models, as illustrated in FIG. 4. This allows the approved intervention to be included in the suggestions for similar requirements change proposed in the future.

Enhancements to Software Lifecycle Tool.

In one embodiment, after the software development has begun, the new tool will apply the same methodology to the development tasks captured in the same Software Lifecycle Management Solution, in which the development originally occurred. Assume for the purpose of this illustrative embodiment that development tracking and version control tools provide a "two step" delivery mechanism, as previously illustrated in FIG. 1a.

Figure 5:
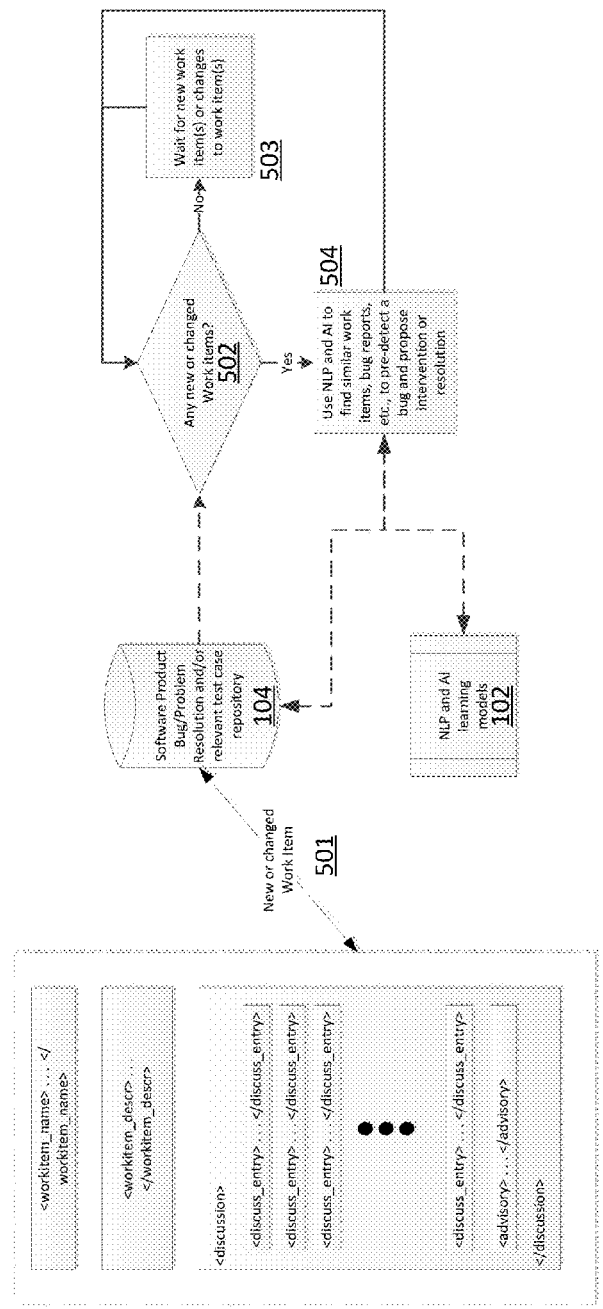
FIG. 5 also reflects a similar process to that of FIG. 3, except for responding to a proposed new or changed work item.

The first step is referred to as "check-in", which sends the latest work to the version control system. The second step is referred to as "delivery", which moves the updated code to the larger, shared version control repository. This kind of system is not part of the invention, per se, but would be used in the context of implementation of the present invention. With each check-in of new or revised source code, that code will be entered into the bug pre-detector tool and tested for adherence to the approved requirement. By having the requirement work item included as a document in the bug pre-detection corpus, it can be detected if a developer has deviated from what was agreed upon in the requirements. This will provide an opportunity to have the new Software Development Advisor insert (502, 503, 504) discussion comments into the work items (501) used as part of the software development tracking tools, as illustrated in FIG. 5.

A Complete Lifecycle Optimizer.

Pre-Detection of Failures and Suggestions of Solutions.

The invention thereby allows a user to perform automated, unattended code reviews based on natural language processing (NLP) and artificial intelligence (AI). In addition to pre-detecting code changes that may deviate an established requirement, another unique benefit of some embodiments of the present invention is to automatically suggest alternative solutions based on modeled predictions around defects, previous performance issues, or any other past discussions around how to adhere to best practices. These all come from the AI Machine Learning models and captured comment corpus. For example, if a developer enters a description of a proposed or recently-made change to the software design to "increase the encryption from 128-bit to 256-bit", the NLP search may find some comments for previous discussion of encryption levels which identify the need to export this product and a requirement not to export certain levels (or above) of encryption, per legal or regulatory standards. The new tool, then, would create a link to those older comments and discussion entries, and would post them automatically into the discussion thread where the developer was proposing the new change. In another example, a developer may propose adding a method call to a third-party voice encoding and decoding module for the purposes of allowing voice annotations to a product's output, but the new tool may find using the NLP search that this third-party voice encoding and decoding module has caused failures in integration testing and field use on multiple occasions, and it may further find comments regarding a "work around" to be to use another supplier's voice encoding and decoding module. As such, a text entry would be automatically entered into the relevant discussion thread, with links to both the potential problem comments and the potential work-around comments.

Pre-Selection of Test Cases.

Once the source code has been delivered, the new tool can run the delivered code through the bug pre-detection tool and will only add to the Machine Learning models once it has been successfully tested that the code is defect-free.

As the work item is delivered and built into a software deliverable, the next phase of some embodiments of the present invention may be engaged. As the code has been previously run through the bug pre-detection tool, the Machine Learning models can be employed to predict a number of things including, but not limited to, defects, performance bottlenecks, and most importantly. These identified defects and bottlenecks may then be mapped to specific tests that would be most effective in testing these aspects of the new code. As in the previous example, if the bug pre-detector tool indicates that a change may invoke a voice compression module to record and store a message or voice annotation, then all known voice compression module tests may be identified using the new NLP search-based tool from an available suite of tests. Further, if a specific voice compression module is invoked, then test cases which are known to exercise and stress previously-found weaknesses in that specific voice compression module will be selected and suggested for validation testing. As in the previous example, if a third-party XYZ voice compression module is reflected in the corpus of comments that it caused a memory error when recording a voice message over 90 seconds in length in past versions of the software product, then the new bug pre-detection tool find this by performing NLP searches on the corpus of test case code and test case description documents, and it would similarly identify and suggest any test cases which automatically attempt to record a message over 90 seconds long to attempt to cause this error (as indicated in the found test code and test case comments).

The effectiveness of different test cases in uncovering defects can be analyzed and rank-ordered. With adequate training, these models will be equipped to identify the optimal design of test cases for different categories of work artifacts. These models can then be applied to new work artifacts to suggest the most efficient test cases.

As the software product containing the new additions or changes enters regression testing phase of development, a suite or collection of test cases can be dynamically built such that the test cases target the newly-updated code by leveraging the trained Machine Learning models. After a regression test is completed, the following steps can be performed:

(1) If the newly-delivered code passes the test(s), the output of the bug pre-detection tool for the newly-delivered code will be added the Machine Learning models to increase the accuracy of the tool's model.

(2) If the test that targets the newly delivered code fails, the output of the bug pre-detection tool will be added to the tool's model as a more reliable example of the features found in the code delivery. This will allow the models to become even more effective, even when the test fails.

A failed test will only be added to the Machine Learning models if it is determined that it was the product that failed, not that the test failed due to it being incompatible with the version of the product being tested.

By applying these methods to a software development program, we can increase code and test quality automatically.

Suitable Computing Platform

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communication capacities of computers and portable devices increase. In such embodiments, the operative invention includes the combination of programmable computing platform and programs. In other embodiments, some or all of the logical processes may be committed to dedicated or specialized electronic circuitry, such as Application Specific Integrated Circuits or programmable logic devices.

Figure 6:
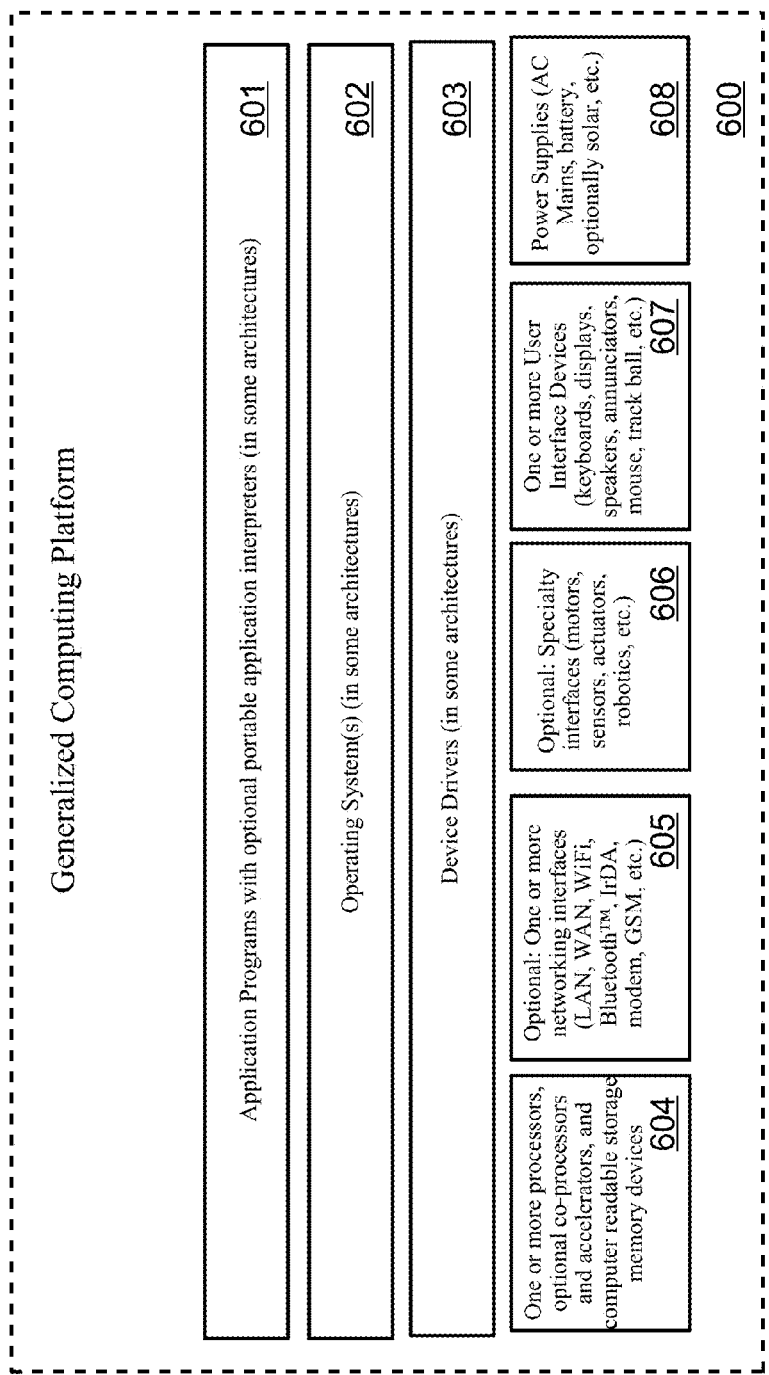
FIG. 6 illustrates a generalized computing platform suitable for combination with program instructions to perform logical processes such as those shown in FIGS. 1*a*, 1*b* and 2-5 to yield a computer system embodiment according to the present invention.

The present invention may be realized for many different processors used in many different computing platforms. FIG. 6 illustrates a generalized computing platform (600), such as common and well-known computing platforms such as "Personal Computers", web servers such as an IBM iSeries™ server, and portable devices such as personal digital assistants and smart phones, running a popular operating systems (602) such as Microsoft™ Windows™ or IBM™ AIX™, UNIX, LINUX, Google Android™, Apple iOS™, and others, may be employed to execute one or more application program(s) to accomplish the computerized methods described herein. Whereas these computing platforms and operating systems are well known and openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (601), which provide specific logical functionality and, which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (604) accompanied by, sometimes, specialized co-processors or accelerators, such as graphics accelerators, and by suitable computer readable memory devices (RAM, ROM, disk drives, removable memory cards, etc.). Depending on the computing platform, one or more network interface(s) (605) may be provided, as well as specialty interfaces for specific applications. If the computing platform is intended to interact with human users, it is provided with one or more user interface device(s) (607), such as displays, keyboards, pointing devices, speakers, etc. And, each computing platform requires one or more power supplies (battery, AC mains, solar, etc.).

Conclusion

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for automatic pre-detection of potential software product impact and recommendation for resolutions, the method comprising the steps of:
    accessing by a computer processor a repository of information containing a history of software project changes and effects attributed to the software project changes subsequent to implementation;
    receiving by a computer processor from a user an input phrase expressed in natural language;
    performing by a computer processor natural language processing to extract symbols from the input phrase, wherein the natural language processing comprises one or more processes selected from the group consisting of deductive logic, inductive logic, validity and soundness checks, rules of thought, truth functionalities, predicate logic, sorites arguments, ethymemes, syntactic analysis, semantic analysis, and pragmatics;
    searching, the repository, by a computer processor, on the extracted symbols which define an unimplemented software project change, wherein the searched symbols exclude symbols which define effects of changes;
    receiving by a computer processor from the searching one or more effects attributed to previously-made software project changes which are similar to symbols which define the unimplemented software project change;
    using by a computer processor, one or more machine learning models to predict one or more components of the software project likely to be impacted subsequent to implementation of the unimplemented software project change, wherein the prediction is generated from the received effects; and
    placing by a computer processor an advisory notice according to the impact prediction into a software development tool, wherein the advisory notice is associated with the input phrase.

2. The method as set forth in claim 1 wherein the input phrase comprises a proposed change to the software project, and wherein the impact prediction comprises a warning of one or more software errors determined to be most probable to be induced by programming changes corresponding to the proposed change.

3. The method as set forth in claim 2 wherein the warning further comprises a suggestion for an alternative change proposition.

4. The method as set forth in claim 1 wherein the input phrase comprises a proposed requirement for the software project, and wherein the impact prediction comprises a warning of a noncompliance with another requirement determined to be most probable to be induced by programming changes corresponding to the proposed requirement.

5. The method as set forth in claim 1 wherein the input phrase comprises a description of an untested revision of the software project, and wherein the impact prediction comprises a suggestion of one or more test cases to be employed to regression test and validate the untested revision of the software project.

6. The method as set forth in claim 5 wherein the suggestion of the one or more test cases is selected from the group consisting of a recommended applicable test case, a non-recommended inapplicable test case, and a modified test suite of a plurality of recommended test cases.

7. The method as set forth in claim 1 further comprising, responsive to receiving by a computer processor a user indication of approval of the impact prediction, updating by the computer processor of the one or more machine learning models.

8. A computer program product for automatic pre-detection of potential software product impact and recommendation for resolutions comprising:
    a computer-readable storage memory device excluding a propagating signal per se; and
    program instructions stored by the computer readable storage memory device for causing a processor to:
    access a repository of information containing a history of software project changes and effects attributed to the software project changes subsequent to implementation;
    receive from a user an input phrase expressed in natural language;
    perform natural language processing to extract symbols from the input phrase, wherein the natural language processing comprises one or more processes selected from the group consisting of deductive logic, inductive logic, validity and soundness checks, rules of thought, truth functionalities, predicate logic, sorites arguments, ethymemes, syntactic analysis, semantic analysis, and pragmatics;

search the repository on the extracted symbols which define an unimplemented software project change, wherein the searched symbols exclude symbols which define effects of changes;

receive from the searching one or more effects attributed to previously-made software project changes which are similar to symbols which define the unimplemented software project change;

use one or more machine learning models to predict one or more components of the software project likely to be impacted subsequent to implementation of the unimplemented software project change, wherein the prediction is generated from the received effects; and place an advisory notice according to the impact prediction into a software development tool, wherein the advisory notice is associated with the input phrase.

9. The computer program product as set forth in claim 8 wherein the input phrase comprises a proposed change to the software product, and wherein the impact prediction comprises a warning of one or more software errors determined to be most probable to be induced by programming changes corresponding to the proposed change.

10. The computer program product as set forth in claim 9 wherein the warning further comprises a suggestion for an alternative change proposition.

11. The computer program product as set forth in claim 8 wherein the input phrase comprises a proposed requirement for the software product, and wherein the impact prediction comprises a warning of a noncompliance with another requirement determined to be most probable to be induced by programming changes corresponding to the proposed requirement.

12. The computer program product as set forth in claim 8 wherein the input phrase comprises a description of an untested revision the software project, and wherein the impact prediction comprises a suggestion of one or more test cases to be employed to regression test and validate the revision of the software project.

13. The computer program product as set forth in claim 12 wherein the suggestion of the one or more test cases is selected from the group consisting of a recommended applicable test case, a non-recommended inapplicable test case, and a modified test suite of a plurality of recommended test cases.

14. The computer program product as set forth in claim 8 further comprising sixth program instructions for, responsive to user indication of approval of the impact prediction, updating the one or more machine learning models, wherein the sixth programming instructions are stored by the computer readable storage memory device.

15. A system for automatic pre-detection of potential software product impact and recommendation for resolutions comprising:

a computing platform having a processor and a computer readable storage memory device; and program instructions encoded by the computer readable storage memory device for causing the processor to:

access a repository of information containing a history of software project changes and effects attributed to the software project changes subsequent to implementation;

receive from a user an input phrase expressed in natural language;

perform natural language processing to extract symbols from the input phrase, wherein the natural language processing comprises one or more processes selected from a group consisting of deductive logic, inductive logic, validity and soundness checks, rules of thought, truth functionalities, predicate logic, sorites arguments, ethymemes, syntactic analysis, semantic analysis, and pragmatics;

search the repository on the extracted symbols which define an unimplemented software project change, wherein the searched symbols exclude symbols which define effects of changes;

receive from the searching one or more effects attributed to previously-made software project changes which are similar to symbols which define the unimplemented software project change;

use one or more machine learning models to predict one or more components of the software project likely to be impacted subsequent to implementation of the unimplemented software project change, wherein the prediction is generated from the received effects; and place an advisory notice according to the impact prediction into a software development tool, wherein the advisory notice is associated with the input phrase.

16. The system as set forth in claim 15 wherein the input phrase comprises a proposed change to the software product, and wherein the impact prediction comprises a warning of one or more software errors determined to be most probable to be induced by programming changes corresponding to the proposed change.

17. The system as set forth in claim 16 wherein the warning further comprises a suggestion for an alternative change proposition.

18. The system as set forth in claim 15 wherein the comprises a proposed requirement for the software product, and wherein the impact prediction comprises a warning of a noncompliance with another requirement determined to be most probable to be induced by programming changes corresponding to the proposed requirement.

19. The system as set forth in claim 15 wherein the input phrase comprises a description of an untested revision the software project, and wherein the impact prediction comprises a suggestion of one or more test cases to be employed to regression test and validate the revision of the software project.

20. The system as set forth in claim 15 wherein the program instructions further comprising instructions for, responsive to user indication of approval of the impact prediction, updating the one or more machine learning models.

* * * * *